United States Patent Office 3,843,393
Patented Oct. 22, 1974

3,843,393
PROCESS FOR COATING TABLETS AND
MAKING DRAGEES
Gregor Groppenbacher, Heddesheim, Peter Rieckmann, Mannheim-Waldhof, Werner Rothe, Hockenheim, Heinz Schalk, Mannheim, and Jurgen Schellhorn, Mannheim-Waldhof, Germany, assignors to Boehringer Mannheim GmbH, Mannheim, Germany
Continuation-in-part of abandoned application Ser. No. 152,797, June 14, 1971. This application Sept. 13, 1972, Ser. No. 288,858
Claims priority, application Germany, June 18, 1970, P 20 29 839.9; Nov. 30, 1971, P 21 59 241.6
Int. Cl. B44d 1/02
U.S. Cl. 117—100 A  10 Claims

ABSTRACT OF THE DISCLOSURE

Process for coating tablet cores, making dragees, or the like, comprising moving a plurality of tablet cores about within a container, introducing a current of gas, e.g., air, through an outlet into said container into the body of the moving tablet cores in such manner that a substantially tablet-free gas space is formed just beyond said gas outlet which is surrounded by said moving tablet cores, and spraying a suspension or solution of a coating material into said current of gas.

---

Figure 1:
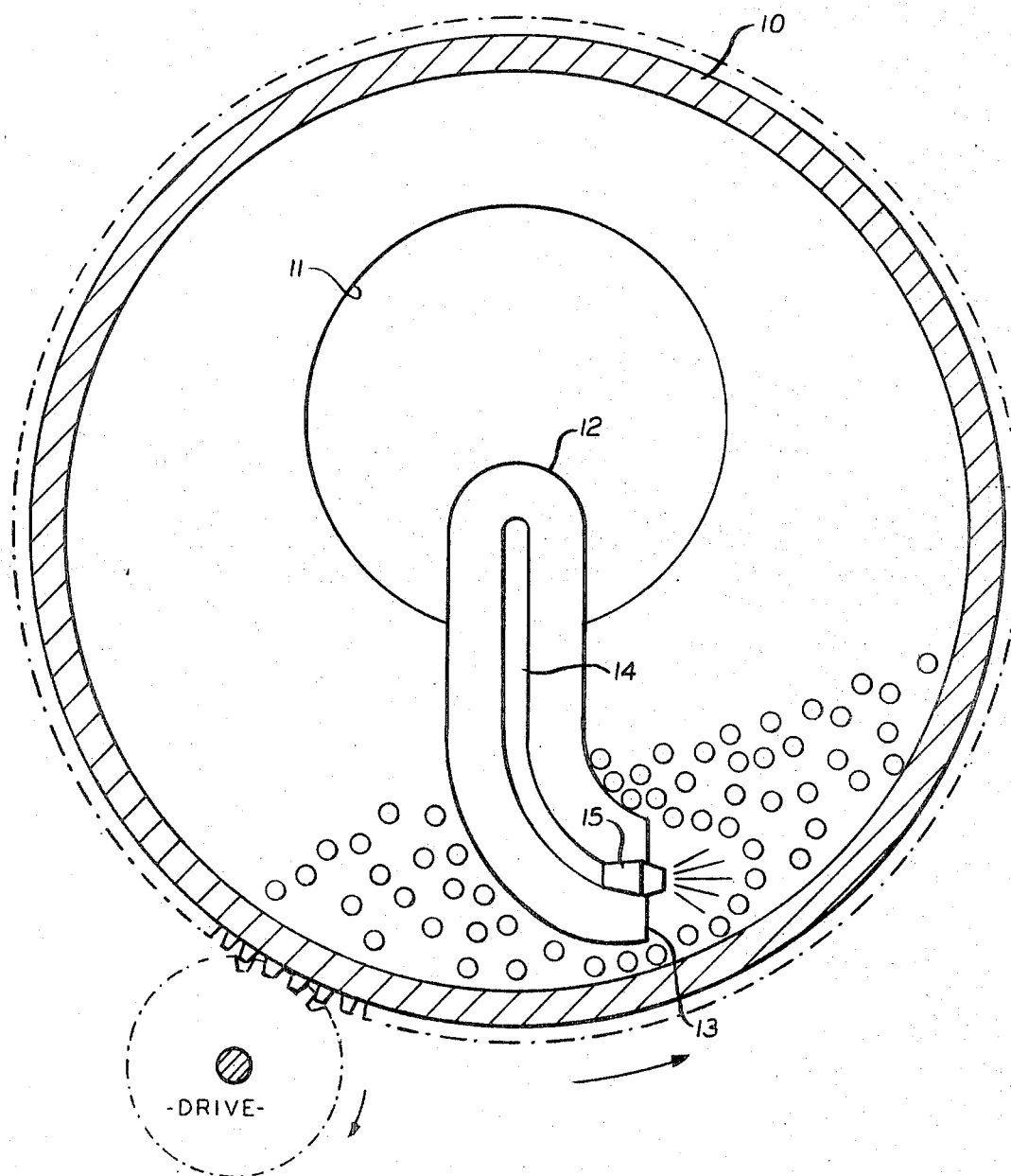

This application is a continuation-in-part of application Ser. No. 152,797, filed June 14, 1971, now abandoned.

The present invention is concerned with a new process for coating or drageeing formed bodies, especially tablets or tablet cores, with coating materials and is also concerned with a device for carrying out this process.

The coating of formed bodies by means of which an impervious coating is formed from film-forming materials and possibly adjuvants, is a process which is of increasing importance for the pharmaceutical industry. Ordinary tablets, which have been obtained by pressing from pharmaceutically active substances and filling and binding agents, must, for a large variety of reasons, by provided with a coating. The most important reasons are the following:

1. Protection from tablet dust in the case of colored or highly active materials;
2. Masking of an unpleasant taste or odor of the active material;
3. Facilitating swallowing due to a smoother and less absorbent surface of the tablets;
4. Protection of the contents of the tablets by means of a coating which is resistant to gastric juices;
5. Improvement of the appearance of the tablets.

The most important coated tablets are sugar dragees, which are coated with a thick covering layer, and film-coated tablets, i.e. tablets having only a relatively thin coating. The (film)-coating of tablets is continuously increasing in comparison with the production of sugar dragees because varnished (film-coated) tablets possess the following advantages:

1. Economic production;
2. Substantially smaller increase of weight and size;
3. The preservation of previously provided scorings and markings on the tablets;
4. Increased storage stability regardless of climatic influences, and thus simplification of packing.

The coating of formed bodies, especially of tablets and tablet cores, is, according to the present state of the art, carried out by one of two principal processes:

1. COATING IN A DRAGEE KETTLE

Drageeing kettles are axially symmetrical vessels which rotate about a horizontal or oblique axis. Consequently, when formed bodies are introduced into a rotating drageeing kettle, they are rolled around. The coating materials are sprayed in the form of aqueous or organic suspensions or solutions on to the moving formed bodies and the solvent or suspension agent is evaporated with a current of cold or warm air.

Whereas when applying a sugar coating the cores must be well moistened with the drageeing suspension in order to achieve a uniform dragee coating, this must normally be avoided in the case of tablet-coating (film coating) in order to prevent cores from sticking together. The rapid distribution of the coating suspension by spraying is, therefore, just as necessary as a simultaneous drying. According to Hess and Jansen ("Lackierte Tabletten und Filmdragees," published in Pharmac. Acta Helvetiae, No. 10, 599/1969), the problem is solved by utilizing a very large number, e.g., several hundred to several thousand, short, successive bursts of spray, drying being carried out by blowing in warm air during the intervening periods of time. In this way, the tablets in the kettle never become so moist that they tend to stick together or adhere to the wall of the drageeing kettle.

Important advantages of this process are that the apparatus used is extremely simple and, in many cases, is already available for the production of sugar dragees. Since the throughput depends practically only upon the volume of the kettle, relatively large quantities of formed bodies can be coated relatively easily. The most important disadvantage of this process is the production of spray mists which apply coating not only to the formed bodies or tablet cores but also to the walls of the kettle, the exhaust pipes therefrom and the suroundings; besides causing an unpleasant contamination, this also results in a loss of up to 50% of the amount of coating sprayed in and thus gives rise to a considerable increase of the cost.

2. COATING IN A FLUIDIZED BED

In the case of the fluidized bed process a stationary vessel is used, formed bodies present therein being held in suspension and moved about by a current of air. A coating solution or suspension is sprayed into this fluidized bed and, due to the current of air which holds the formed bodies in suspension, the solvent or suspension agent is simultaneously evaporated off (cf. Zeller, "Lackieren von Presslingen in der Flugschicht," Pharmaz. Industrie, 31, November 1969).

The advantage of such a technique lies in the rapid drying of the cores as a result of the high throughput of air and in the enclosed working space used which ensures clean operating conditions. However, a disadvantage of the apparatus used is that it is relaitvely expensive and, in most cases, necessitates new capital investment. Further disadvantages are the high operating costs (use of large amounts of air) with the use of relatively small batches about 10–30 kg.). Furthermore, it has been found that only relatively tough or hard cores can be introduced into such a fluidized bed if the attrition caused by rubbing together of the cores is not to be too great.

The present invention provides a process and device which combine, as far as possible, the advantages of coating in a drageeing kettle with the advantages of the fluidized bed process, and thus does away with the inherent draw-backs of prior art processes.

We have now found that this can, surprisingly, be achieved with the use of a conventional drageeing kettle in which the drying air is not, as previously, blown on to the surface of the cores moved about by the rotation of the kettle but is blown in through an immersion tube, which terminates near the bottom of the drageeing kettle, into the middle of the cores and a suspension or solution of coating materials is sprayed into the small tablet-free gas space which is established just beyond the mouth of the immersion tube. This space is created by the expressed drying gas which is appropriate in pressure and volume so as not to blast through the tablet cores, in which case the coating would not be fully utilized before the gas is exhausted, and so as not to permit only a few cores adjacent the mouth to receive too much coating and adhere to each other with ultimate caking and clogging.

In spite of the comparatively strong current of the drying air, we have found that the spray mists are deposited practically quantitatively on the formed bodies and thus the troublesome contamination of the dragéeing kettle and of the surroundings, as well as the loss of the coating suspensions or solutions, which are sometimes very expensive, are avoided.

Since the drying air comes into intensive contact with the cores or formed bodies, we have also found that the amount of air can be considerably reduced in comparison with the conventional process and, nevertheless, a more rapid drying is achieved.

For carrying out the process according to the present invention, it is substantially immaterial which coating formulation is employed so long as it has a viscosity which is sufficiently low to permit efficient spraying thereof. Furthermore, practically all cores and formed bodies can be used which are also sufficiently stable under the conditions prevailing in the case of sugar dragéeing.

Figure 2:
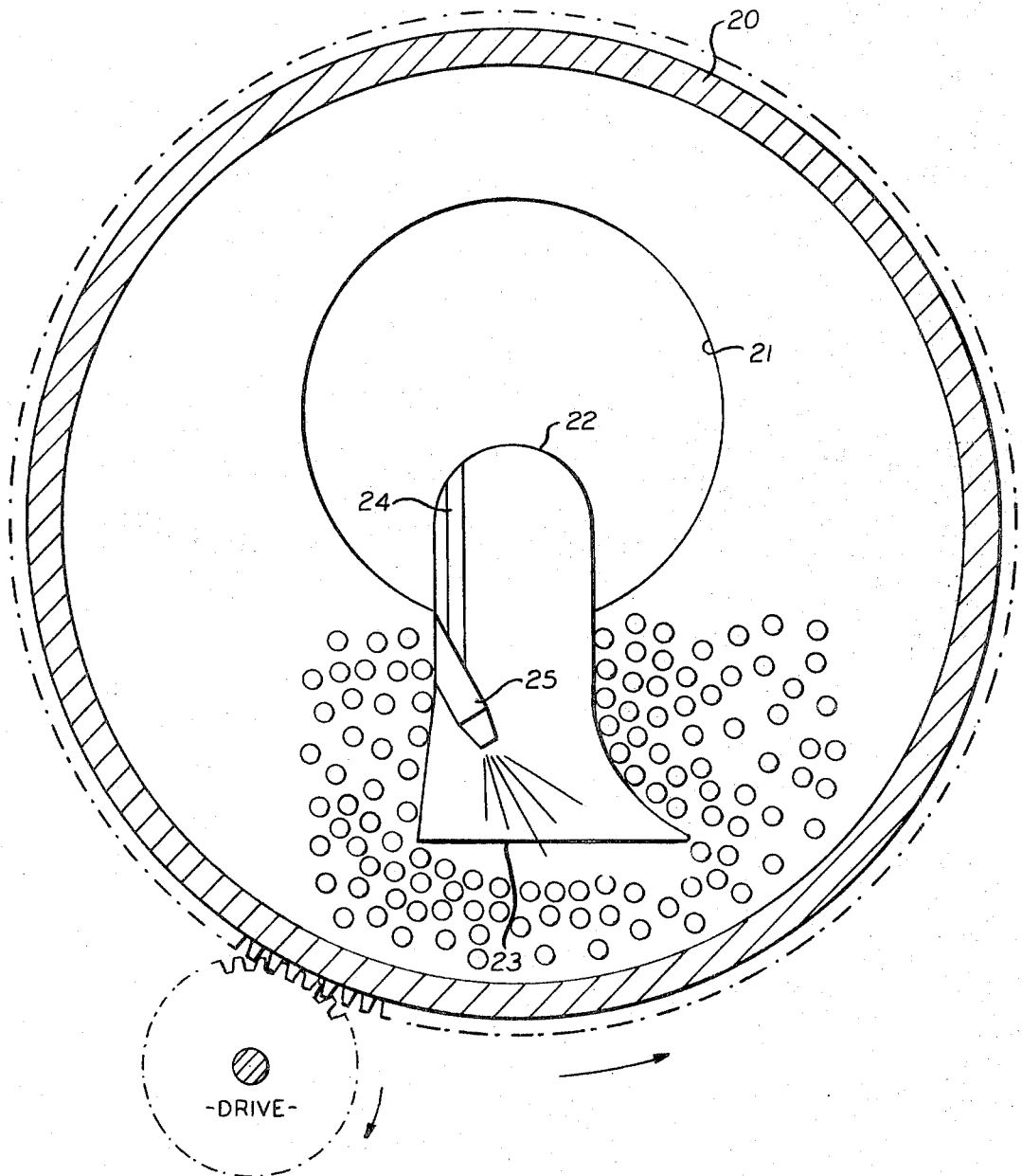

The invention will be further described with reference to the accompanying drawings wherein:

FIG. 1 is a schematic sectional view through a dragéeing vessel with one embodiment of gas and liquid inlets in accordance with the invention; and FIG. 2 is a similar view of another embodiment of gas and liquid inlets in accordance with the invention.

Referring now more particularly to the drawings, both of which show their immersion tubes on a magnified disproportionate scale, the form and arrangement of the immersion tubes can be altered substantially while still being able to fulfill the purpose according to the present invention. One form which has been found to be especially useful is illustrated in FIG. 1 wherein spherical container 10 is mounted with its axis inclined at an angle of about 30 degrees to the horizontal, the container being rotated about its axis by a drive. The container has a gas outlet 11 above the tablets for escape of gas supplied near the container bottom and is mounted so as to be stationary but not to interfere with rotation of the container. The pipe 12 bends inside the container in the same direction as the rotation of the container so that its opening 13, whose plane is substantially vertical, is adjacent the container bottom. Axially of pipe 12 there is a spray nozzle supply pipe 14 which terminates in a nozzle 15 located substantially in the plane of opening 13.

In FIG. 2 the cylindrical container 20 rotates about a horizontal axis and is provided with a gas outlet 21 above the level of the tablet cores. A vertical immersion tube or pipe 22 projects into container 20 and its horizontal opening 23 is widened in the direction of rotation of the container, i.e., counterclockwise. A spray nozzle supply pipe 24 is secured inside pipe 22 and terminates in a nozzle 25 so located that spray therefrom is discharged in th direction of movement of gas discharged through pipe 22.

The process according to the present invention for the coating of tablet cores and the like with film-forming materials is, therefore, characterized in that a suspension or solution of film-forming materials is sprayed into a current of drying air which is on all sides surrounded and enveloped by moving tablet cores or the like.

In order to obtain an especially uniform coating, we have found it to be advantageous to conduct the current of drying air, and thus the current of sprayed coating solution or suspension, substantially in the direction which corresponds to the movement of the cores or the like brought about by the rotation of the container and by the action of gravity.

Whereas in the case of the conventional coating process in a dragéeing kettle, single-component nozzles are necessary in order to minimize the spray mist, it being necessary, therefore, to operate with spray pressures of up to 150 atmospheres, such spray mists do not have a disturbing effect in the case of the process according to the present invention. Therefore, according to the present invention, there can also be used, with good results, two-component nozzles which can be operated at an atomizing air pressure of only 2 to 5 atmospheres.

It has proved to be especially advantageous that, with the process according to the present invention, the amount of coating applied to the individual tablet cores or the like can be precisely predetermined. Therefore, highly active materials can be incorporated into the varnish suspension and, nevertheless, can be applied uniformly in precise amounts to the individual tablet cores or the like without waste.

While the process and apparatus of this invention is eminently useable for tablet-coating as disclosed hereinabove, the instant invention can also be used for making dragées, i.e., to provide a thick, usually sugar-containing coating which is normally many times the thickness of an ordinary tablet coating. (As used throughout the instant specification, for purposes of simplicity the term "coating" shall be deemed to apply both to ordinary tablet-coating, i.e., varnishing, and to dragée making, i.e., covering the tablet cores with a heavy sugar coated dragée coating.)

Although tablet-coating processes are becoming more important in the pharmaceutical industry, the dragéeing of pharmaceuticals is still widely used, because dragéeing solutions or suspensions are largely aqueous and can thus be simply and cheaply produced and do not involve problems as do some tablet-coating processes, caused by evaporation of organic solvents. A considerable disadvantage of the customary dragéeing processes, however, lies in the fact that the application of the dragéeing solution or dragéeing suspension is very critical and the application of the dragée layer must always be controlled and guided. In addition, this procedure is time-consuming and results in a low capacity of the conventionally equipped dragéeing devices.

The process according to the invention, as applied to making dragées specifically, is carried out in such a manner that in case of a commercial dragéeing kettle the drying air is no longer, as done hitherto, blown onto the surface of the formed bodies moved by the rotation of the kettle, but the air is blown through an immersion tube, which terminates near the bottom of the dragéeing kettle, into the middle of the formed bodies and sprays the dragéeing solution or dragéeing suspension into the air sac, formed around the opening of the immersion tube.

This new possibility of using the immersion tube of the invention is highly desirable and advantageous because conventional dragéeing solutions or suspensions had to be highly concentrated to prevent any penetration of moisture into the formed body. However, a uniform spraying according to the instant process is hardly possible with such highly concentrated solutions or suspensions. On the other hand, diluted sugar-containing solutions or suspensions can be easily sprayed, but dry so slowly that formed bodies without protection against moisture by way of a thin coating envelope provided in the art (prior to dragéeing), become moist and unusable and, in extreme cases, can even disintegrate or crumble.

In accordance with the dragée-making aspect of the invention, it is possible to use diluted, e.g. containing 20–70 wt. percent of sugar, and thus easily sprayable solutions or suspensions for coating. For it has been found that the drying process of the layers applied is so considerably shortened by the blowing in of air into the middle of the formed bodies that the above described disadvantages of conventional dragéeing cannot occur; this to such an extent that even the preliminary coating envelope for the dragée cores, necessary when using concentrated dragéeing solutions or dragéeing suspensions as explained above, is no longer necessary when using this invention.

In addition, the process according to the invention is advantageous because it is now possible to provde formed bodies with a very thin sugar coating, which has all of the advantages of a varnishing (i.e., thin) layer and, in addition, is appreciably cheaper and simpler to apply. Furthermore, the dragée coatings applied in accordance with the invention are distinguished in that the amount to be applied is very uniformly distributed and therefore can be accurately predetermined for each dragée. Therefore, highly active substances can be incorporated into the dragéeing solution or dragéeing suspension and, nevertheless, can be accurately dosed, particularly because the coatings do not deposit on the kettle wall and no spray mist gets into the outgoing air. The customary dragéeing suspensions are, for carrying out the process according to the invention, diluted to such an extent that they can be sprayed uniformly to result in an extremely high-quality, satisfactory product.

In accordance with the invention, the coating can take place in one time step, i.e., it is possible to carry out the spray phase simultaneously with the drying phase. However, particularly when applying thicker dragée coatings, the tablet cores can also be alternately sprayed, distributed and dried.

Thus, the instant invention comprises coating moving formed bodies, such as tablets, with a spray jet of a sprayable dragéeing solution or dragéeing suspension, surrounded by a current of air, characterized in that the spray jet with the surrounding current of air is directed into the mass of moving tablets by means of an immersion tube.

The present invention also provides an apparatus for varnishing or coating tablet cores and the like, this device comprising a container for said cores, means for rotating said container, fixed means for introducing a gas into said container adjacent its bottom independently of the rotation of said container, said container being provided with an outlet for said gas, whereby gas introduced into said container traverses said container on its way to said outlet, and means for spraying liquid into said gas introducing means so that said sprayed liquid flows into said container together with said gas. If desired, the spray nozzle can be constructed as a two-component nozzle. Furthermore, the spray nozzle and the opening of the air inlet can discharge their fluids in a direction parallel to the bottom of the dragéeing kettle.

A further aspect of the process of the instant invention is the use of the invention apparatus consisting of (a) a dragéeing kettle (known per se)
(b) a spray nozzle with inlet pipe for the dragéeing solution or dragéeing suspension and an inlet pipe for the drying air, which are combined to an immersion tube, which terminates near the bottom of the dragéeing kettle, for applying dragéeing solution or dragéeing suspensions onto moving formed bodies such as tablets and tablet cores.

The following Examples are given for the purpose of illustrating the present invention:

Example 1

50 kg. of scored placebo dragée cores are placed in a dragéeing kettle, in accordance with FIG. 1, rotated at 30 r.p.m. about an axis inclined at 30° to the horizontal. The cores have a diameter of 10 mm., a Stokes hardness of 3 kp. and an average weight of 333 mg. per core.

A tube made of polypropylene with an internal diameter of 8 cm. which broadens out via a curve into an end piece of 12 cm. diameter, dips into the cores. The air exit opening points in the direction of downwardly directed flow of the cores. In the middle of the air exit opening, there is a two-component nozzle which, for aerodynamic reasons, has a conical shape. The nozzle opening is 1.5 mm. The varnish suspension, which is kept continuously stirred, is supplied without pressure. An atomization pressure of 2 atmospheres gage is used. The immersion tube operates at a rate of 500 m.$^3$/hour and the air is blown in at ambient temperature.

With the use of the above-described device, there is sprayed onto the cores, within the course of 50 minutes, 6000 g. of the following varnish suspension:

| | Parts |
|---|---|
| Eudragit E (12.5%) | 300 |
| Talc | 50 |
| Titanium dioxide RN 56 | 40 |
| Yellow varnish ZLT 2 (FDA—approved No. FD+C Yellow 5) | 20 |
| Polyglycol 6000 | [1]10 |
| Ethanol | 580 |

[1] 50% aqueous solution.

When the application of the varnish is finished, the drageeing kettle is rotated for about another 5 minutes. In this way, a varnish-like gloss is automatically obtained. The average increase of weight is 6 mg./core.

Example 2

A varnish solution is applied with an application device similar to that used in Example 1 but with the following alterations:

(a) the immersion tube has the form illustrated in FIG. 2 of the accompanying drawings;

(b) the nozzle has the shape and arrangement shown in FIG. 2 of the accompanying drawings and has an opening of 1 mm.;

(c) dry air is applied in an amount of 300 m.$^3$/hour and at a temperature of 20° C.

The varnish suspension applied has the following composition:

| | Parts |
|---|---|
| Ethyl cellulose | 60 |
| Polyvinyl-pyrrolidone | 10 |
| Polyoxyethylene stearate | 10 |
| Carbon tetrachloride | 880 |
| Isopropanol | 40 |

Example 3

Into a dragéeing kettle, there are placed 50 kg. of rod-shaped placebo granules averaging 10 mg. in weight, 5 mm. in length and 1.5 mm. in diameter, and these are then varnished in the manner described in Example 1. However, instead of yellow varnish ZLT 2, there is used the same amount of a brown iron oxide pigment. The amount of varnish applied is 8000 g.

Example 4

Using the application apparatus described in Example 1, 50 kg. of round placebo cores with a diameter of 10 mm. and an average individual weight of 333 mg. are sprayed with a varnish formulation of the following composition:

| | G. |
|---|---|
| Eudragit L | 8000 |
| Eudragit S | 8000 |
| Talc | 5800 |
| White spirit | 18200 |

The finished varnished dragées have an average increase of weight of 43 mg. Their disintegration corresponds to the requirements for coatings resistant to gastric juices according to Deutsches Arzneibuch 7th Edition.

Example 5

Onto 10,000 placebo hard gelatine capsules of oblong form and of size 2 with an average of 438 mg. there is applied in a dragéeing kettle, by means of the device used in Example 3, the following varnish solution:

| | G. |
|---|---|
| Hydroxypropylmethyl-cellulose phthalate | 42.0 |
| Diethyl phthalate | 12.6 |
| Acetone | 365.4 |

The capsules are satisfactorily varnished. The increase of weight per capsule is, on average, 42 mg.

Example 6

In the manner described in Example 1, 50 kg. of round placebo dragée cores with an average individual weight of 333 mg. and a diameter of 10 mm. are treated with the following varnish solution:

| | Parts |
|---|---|
| Eudragit E (12.5%) | 300.0 |
| Talc | 49.5 |
| Titanium dioxide RN 56 | 40.0 |
| Yellowish varnish ZLT 2 | 20.0 |
| Polyglycol 6000 | [1] 10.0 |
| Digoxin | 0.5 |
| Ethanol | 580.0 |

[1] 50% aqueous solution.

The average increase of weight is 6 mg./core. The varnish coating of each core contains 0.2 mg. digoxin. Analytical determinations according to United States Pharmacopoeia *17*, page 198, on 50 varnished dragées give a digoxin content of 0.2 mg.+10%. Varnishing by means of the process according to the present invention permits a sufficiently accurately measured incorporation of a small amount of an active material into the varnish coating.

Eudragit E employed in the foregoing examples is a cationic copolymer of dimethyl aminoethyl methacrylate and lower alkyl methacrylates; Eudragit L and S are anionic copolymers of methacrylic acid and lower alkyl methacrylates, the proportions of monomers differing in the two to modify the water solubility. The polymers are available from Rohm A.G. of Darmstadt, Germany.

Example 7

50 kg. of scored placebo dragée cores are placed in a dragéeing kettle. The cores have a diameter of 10 mm. and a hardness of 3 kilopond (kp.) (after Stokes). The average weight of the core amounts to 333 mg.

A tube made of polypropylene with an internal diameter of 8 cm., which broadens out via curve into an end piece of 12 cm. diameter, dips into the cores in such a manner that the level of the core mass just covers the curved portion of the tube (as shown in FIG. 1). Air is forced through the tube and the air exits of the tube open in the direction of the flow of the cores. In the middle of the air exit opening, there is a two-component nozzle which, for aerodynamic reasons, has a conical shape. The nozzle opening is 1.8 mm. The dragéeing suspension is supplied without pressure. The atomization (air) pressure is 3 atmospheres (gauge). The immersion tube operates at a rate of 500 m.³/hour. The air is blown in at 60° C.

With the use of the above described device, there is sprayed onto the cores, within a period of 30 minutes, at room temperature, 4.35 kg. of the following dragéeing suspension (compare German patent 1,184,459):

| | Percent by weight |
|---|---|
| Sugar | 37.2 |
| Kaolin | 8.0 |
| Titanium dioxide | 1.6 |
| "Kollidon 25" | 0.4 |
| Polyglycol(HM 100) | 2.8 |
| Glucose | 2.0 |
| Water | 47.6 |
| Blue varnish | 0.4 |

The finished dragées contain 15 mg. of solid material, i.e., core, within the dragée coating.

Example 8

The dragéeing solution is applied with an application device according to Example 1, but with the following alterations:

(a) The immersion tube has the form as in FIG. 2 and consists of chromium plated steel.
(b) Spraying takes place for 3 minutes alternating with a wait of 1 min. (lubricating time); afterwards the dragées are post-dried with warm air for 4 min. The spray air current is not interrupted.

The following dragéeing suspension (compare German patent 1,184,459) is sprayed on:

| | Percent by weight |
|---|---|
| Sugar | 46.5 |
| Calcium carbonate | 10.0 |
| Titanium dioxide | 2.0 |
| Polyglycol (HM 100) | 3.5 |
| Kollidon 25 | 0.4 |
| Potassium dihydrogen phosphate | 0.1 |
| Starch syrup | 2.5 |
| True yellow (Echgelb) | 0.5 |
| Erythrosin | 0.02 |
| Water | 34.5 |

There are obtained very uniformly coated dragées having a smooth surface, which can be additionally glossed with customary methods, such as hard wax E, dissolved in carbon tetrachloride.

It will be appreciated that the instant specification and examples are set forth by way of illustration and not limitation and that various modifications and changes may be made without departing from the spirit and scope of the present invention.

What is claimed is:

1. In the process of coating tablet cores or the like with a coating comprising placing said cores in a container, rotating said container to move said cores about, supplying a suspension or solution of coating material to said container to coat said cores and supplying a drying gas to said container to dry the coating on said cores, the improvement which comprises introducing said drying gas into the body of moving tablet cores below the level thereof in such manner that a substantially tablet-free gas space is formed just beyond the point of discharge of said gas, said gas being directed in the main direction of movement of the tablet cores, spraying of said coating material into said gas space taking place in a direction substantially parallel to the direction of discharge of said gas.

2. Process according to claim 1, wherein movement of said tablet cores is effected by rotation of said container and by the action of gravity.

3. Process according to claim 1, wherein the current of gas is directed in the main direction of movement of the tablet cores.

4. Process according to claim 1, wherein the suspension or solution of the coating material is sprayed into the current of gas substantially parallel thereto.

5. Process according to claim 1, wherein the suspension or solution of the coating material contains a precisely determined amount of a therapeutically active material whereby substantially all of said active material is picked up by said tablet cores, each core receiving substantially the same amount.

6. Process as claimed in claim 1, wherein said coating suspension or solution contains a film-forming material and a coated tablet is formed.

7. Process as claimed in claim 6, wherein said film-forming material is suspended or dissolved in an organic solvent.

8. Process as claimed in claim 1, wherein said coating suspension or solution contains a sugar and a dragée is formed.

9. Process as claimed in claim 8, wherein said sugar is in aqueous solution.

10. Process as claimed in claim 8, wherein the concentration of said sugar in said suspension or solution is from 20 to 70 percent by weight.

References Cited

UNITED STATES PATENTS

| | | | |
|---|---|---|---|
| 3,231,413 | 1/1966 | Berquin | 117—100 |
| 3,152,005 | 10/1964 | Tuttle | 117—100 A |
| 3,573,966 | 4/1971 | Hostetler | 117—100 A |
| 3,141,792 | 7/1964 | Lachman et al. | 117—105.3 |
| 1,239,221 | 9/1917 | Rodman | 117—109 |
| 3,383,236 | 5/1968 | Brindamour | 117—100 |
| 3,379,554 | 4/1968 | Brindamour | 117—100 |
| 3,383,237 | 5/1968 | Tuerck | 117—100 |
| 3,480,468 | 11/1969 | Carletti et al. | 117—100 |
| 3,390,049 | 6/1968 | Rednick et al. | 117—100 |
| 3,573,954 | 4/1971 | Yamamoto | 117—100 |

WILLIAM D. MARTIN, Primary Examiner

D. C. KONOPACKI, Assistant Examiner

U.S. Cl. X.R.

117—104 R, 109